United States Patent [19]

Megna

[11] Patent Number: 4,607,062
[45] Date of Patent: Aug. 19, 1986

[54] CATALYST COMPOSITIONS FOR POLYALIPHATIC ISOCYANATE-BASED POLYURETHANES AND PROCESS FOR THEIR USE

[75] Inventor: Ignazio S. Megna, Lebanon, N.J.

[73] Assignee: American Cyanamid Company, Stamford, Conn.

[21] Appl. No.: 764,470

[22] Filed: Aug. 12, 1985

Related U.S. Application Data

[60] Division of Ser. No. 568,159, Jan. 4, 1984, Pat. No. 4,548,919, which is a continuation-in-part of Ser. No. 450,626, Dec. 17, 1982, abandoned.

[51] Int. Cl.$^4$ .................... C08G 18/14; C08G 18/24; C08G 18/26; B01J 31/04
[52] U.S. Cl. ................................ 521/124; 252/182; 521/51; 528/55; 528/58
[58] Field of Search ................ 521/51, 124; 528/55, 528/58

[56] References Cited

U.S. PATENT DOCUMENTS

| | | | |
|---|---|---|---|
| 3,267,047 | 8/1966 | Smitter et al. | 528/58 |
| 3,342,757 | 9/1967 | Considine et al. | 502/170 |
| 3,506,598 | 4/1970 | Groff et al. | 502/170 |
| 4,018,708 | 4/1977 | Vogt et al. | 502/152 |
| 4,131,662 | 12/1978 | Cekovik et al. | 521/51 |

*Primary Examiner*—Herbert S. Cockeram
*Attorney, Agent, or Firm*—Gordon L. Hart

[57] ABSTRACT

A catalyst composition for improving the reaction-cure rate of polyurethane compositions derived from poly aliphatic isocyanate compounds and poly-hydroxyl bearing compounds is disclosed. The catalyst composition consists essentially of (a) from about 25 to about 75 parts by weight of lead naphthenate; and
(b) from about 75 to about 25 parts by weight of at least one dialkyltin dicarboxylate compound of the formula:

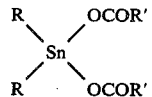

wherein R is selected from $C_1$ to $C_8$ alkyl and R' is selected from $C_1$ to $C_{18}$ alkyl, based upon 100 parts by weight of said catalyst composition.

The catalyst compositions promote sufficiently rapid cure rates such that injection moldable poly aliphaticisocyanate-based polyurethane compositions may be provided. In a preferred embodiment, new and improved integral skin foam polyurethane compositions are disclosed which may be reaction injection molded to form integral skin foam shaped articles exhibiting ultraviolet light resistance and improved colorability.

10 Claims, No Drawings

CATALYST COMPOSITIONS FOR POLYALIPHATIC ISOCYANATE-BASED POLYURETHANES AND PROCESS FOR THEIR USE

CROSS REFERENCE TO RELATED APPLICATION

This is a division of application, Ser. No. 568,159, filed Jan. 4, 1984, now U.S. Pat. No. 4,548,919, which is a continuation-in-part of copending application Ser. No. 450,626, filed Dec. 17, 1982 and now abandoned.

BACKGROUND OF THE INVENTION

The present invention relates to catalyst compositions effective to accelerate curing of aliphatic-isocyanate-based polyurethane compositions. More particularly, it relates to new and improved catalyst compositions consisting essentially of synergistic mixtures of an organic tin compound and an organic lead compound and to an improved method of curing polyurethane compositions employing these catalyst compositions. The present invention also relates to new and improved integral skin foam polyurethane compostions and to improved methods for making useful shaped articles therefrom.

In this application, the term "aromatic isocyanate" refers to an organic isocyanate compound wherein the isocyanate group(s) are bonded directly to a carbon atom of an aromatic nucleus. By "aliphatic isocyanate" is meant an organic isocyanate compound wherein the isocyanate group or groups are bonded directly to an aliphatic carbon atom. The term polyaliphatic isocyanate means a compound having more than one aliphatic-isocyanate linkage in one molecule.

Generally, polyurethane resins and products are obtained by reacting isocyanate compounds and hydroxyl-bearing compounds to form urethane groups in accordance with the equation:

RNCO+R'OH→RNHCOOR'

Polyurethane resins are formed by reaction of polyfunctional starting materials containing isocyanate and hydroxyl groups.

Polyurethane resins and articles prepared therefrom are extremely useful because upon curing they can be flexible or rigid and articles prepared therefrom are generally characterized by good solvent resistance, abrasion resistance, impact resistance and colorability.

It is presently known to use polyurethanes to form integral skin foam articles which comprise a core of microcellular foam and a skin which is either microcellular or non-cellular. The prior art polyurethane integral skin foam compositions generally comprise an aromatic isocyanate, such as bis(isocyanatophenyl)methane, a polyol, and a foaming agent. Aromatic isocyanates have been employed because of their high reactivity and rapid cure times. These compositions are castable to form elastomeric articles or may be injection molded in one step in accordance with reaction injection molding (RIM) techniques. The outer surfaces of the skins of these shaped articles can be provided with many and varied decorative features imparted by the inner surfaces of the casting or injection molds, to simulate the appearance of leather or wood materials and the like. Polyurethane integral skin foam products have therefore been extensively used in furniture, automobile, electronics and footwear applications.

A serious disadvantage encountered with these polyurethane compositions and integral skin foam products prepared therefrom is that polyurethanes based on aromatic isocyanates have extremely poor ultraviolet light stability and undesirable yellowing or other discoloration develops with these materials upon exposure to sunlight or other sources of ultraviolet light. In the past, where these compositions were utilized to form colored products, such as, cushions, armrests, seat backs or the like, they had to be colored to an intense shade, or to a dark shade or to black, to hide the undesirable discoloration of the resin. If it was necessary or desired to provide light or brightly colored articles, the articles had to be prepared with a separate non-urethane colored coating layer or had to be dipped or otherwise coated with an ultraviolet light resistant protective layer. These additional coating and production steps are expensive and inefficient in large scale production operations.

More recently, aliphatic isocyanate compounds and polyurethane compositions incorporating them have been developed. The aliphatic isocyanates and their preparation are suitably disclosed in U.S. Pat. Nos. 2,723,265 and 3,290,350. Polyurethane compositions based on these aliphatic compounds are known to have excellent ultraviolet light stability and do not discolor upon exposure to sunlight and other sources of ultraviolet radiation. However, the aliphatic isocyanates are considerably less reactive than the aromatic isocyanates. Extended reaction times render aliphatic-isocyanate based polyurethane compositions generally unsuitable for reaction injection molding applications because molding cycle times need to be prohibitively long and the integral skin foam products ultimately obtained are generally soft and exhibit less than desirable strength and load-supporting capability.

Many catalysts have been employed in an effort to accelerate the rate of reaction between aliphatic isocyanates and hydroxyl-containing compounds. Organic lead salts and organic tin salts are two of the more commonly used catalyst materials herefore employed for this purpose. Neither of these catalysts however, when used alone at any reasonable concentration, is effective to adequately accelerate the reaction between secondary and tertiary aliphatic isocyanates and hydroxyl-containing compounds at temperatures below about 100° C., which means that lead catalysts and tin catalysts when used singly are not sufficiently effective to provide a satisfactory RIM moldable aliphatic isocyanate-based polyurethane integral skin foam composition.

In U.S. Pat. No. 4,150,206, a reaction injection moldable polyurethane integral skin foam composition based on an aliphatic isocyanate is disclosed. The compositions are described as possessing a reactivity level substantially similar to the reactivity of aromatic isocyanates. The compositions comprise a polyol, an aliphatic isocyanate, a minor amount of water and a synergistic catalyst combination selected from the following catalyst mixtures:

(i) an amine containing a structure,

and a salt, alcoholate and/or phenolate of an alkali metal or alkaline earth metal;

(ii) an organic lead compound and a primary or secondary amine;

(iii) an organic lead compound and an amine containing the structure

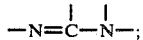

or (iv) an organic lead compound and a salt, alcoholate or phenolate of an alkali metal or alkaline earth metal.

It is disclosed in said patent that if one of the above-identified catalyst mixtures is present, that satisfactory reaction rates suitable for RIM processes are obtained and that other catalysts such as tin catalysts, may be added if desired.

Unexpectedly, in view of the foregoing, it has now been discovered that the rate of reaction between aliphatic isocyanate compounds and hydroxyl containing compounds is surprisingly improved by the incorporation of a catalyst composition consisting essentially of certain synergistic mixtures of lead naphthenate and dialkyltin dicarboxylates in specified proportions, said catalyst compositions being added in carefully specified amounts.

SUMMARY OF THE INVENTION

In accordance with the present invention, new and improved compositions for catalyzing the reactions between polyaliphatic-isocyanate compounds and organic compounds containing a plurality of hydroxyl groups consist essentially of a mixture of (a) lead naphthenate and (b) at least one dialkyltin dicarboxylate compound of the formula:

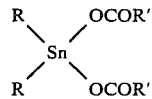

wherein R is $C_1$ to $C_8$ alkyl and R' is $C_1$ to $C_{18}$ alkyl, the weight ratio of lead naphthenate to said dialkyltin dicarboxylate in said mixture being from about 25:75 to about 75:25.

The synergistic catalyst mixtures of the present invention unexpectedly and surprisingly are effective to significantly reduce the reaction-cure time of a poly aliphatic-isocyanate based polyurethane composition, as compared with the cure times obtained with an organic lead compound or an organic tin compound used alone. Generally, the new and improved catalyst mixtures of the present invention are added to poly aliphatic-isocyanate based polyurethane compositions in minor effective amounts on the order of from about 0.01 to 10 parts by weight, based upon 100 parts by weight of the aliphatic isocyanate and hydroxyl-bearing reactants, preferably from about 0.05 to about 5.0 parts by weight, based on the weight of the isocyanate and hydroxyl containing reactants, and especially preferably, from about 2.0 to about 6.0 parts by weight based upon 100 parts by weight of the hydroxyl-bearing reactants.

In accordance with another aspect of the present invention, highly reactive, rapidly curable polyurethane compositions are provided, said compositions comprising:

(a) a mixture or a prepolymer of:

(i) a poly aliphatic isocyanate compound of the formula:

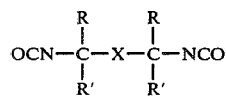

wherein R and R' are each, independently, selected from hydrogen, alkyl or substituted alkyl and x is a bridging means selected from aliphatic, cycloaliphatic or aromatic groups, or a prepolymer adduct of said isocyanate compound possessing polyaliphatic isocyanate functionality; and (ii) a monomeric or polymeric compound containing a plurality of hydroxyl groups; and (b) a minor effective amount of a catalyst composition therefor consisting essentially of a mixture of:

(i) from about 25 to about 75 parts by weight of lead naphthenate; and (ii) from about 75 to about 25 parts by weight of a dialkyltin dicarboxylate compound of the formula:

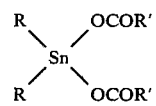

wherein R is selected from $C_1$ to $C_8$ alkyl and R' is selected from $C_1$ to $C_{18}$ alkyl, based upon 100 parts by weight of said catalyst composition.

The rapidly curable poly aliphatic isocyanate-based polyurethane compositions of this invention, containing effective amounts of the synergistic catalyst compositions described herein, exhibit sufficiently rapid cure times such that the compositions may be effectively employed to provide useful shaped articles by high speed casting and reaction injection molding techniques.

In accordance with a preferred embodiment of this aspect of the invention, new and improved reaction injection moldable integral skin foam polyurethane compositions are provided. These new and improved integral skin foam compositions comprise:

(a) an aliphatic disocyanate compound of the formula:

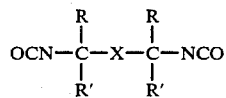

wherein R and R' are each independently, selected from hydrogen, alkyl and substituted alkyl and X is a bridging means selected from divalent aliphatic, cycloaliphatic or aromatic groups, or a prepolymer adduct of said isocyanate compound possessing poly aliphatic isocyanate functionality;

(b) a mixed polyol component comprising:

(i) from about 50 to about 100 parts by weight of a vinyl monomer-grafted polyether polyol having a hydroxyl value of about 20 to about 60; and (ii) from about 50 to about 0 parts by weight of a polyether polyol having an hydroxyl value of about 20 to 60, per 100 parts by weight of said polyol mixture;

(c) an effective amount of a crosslinking agent, said crosslinking agent comprising mixture of an amino alcohol and ethylene glycol or a low molecular weight adduct of ethylene oxide and a polyol compound in a weight ratio of from about 1:3 to 3:1, respectively;

(d) a minor effective amount of a catalyst composition therefor, said catalyst composition consisting essentially of:
  (i) from about 25 to about 75 parts by weight of lead naphthenate; and
  (ii) from about 75 to about 25 parts by weight of an organic tin dicarboxylate compound of the formula

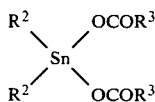

wherein $R^2$ is selected from $C_1$ to $C_8$ alkyl and $R^3$ is selected from $C_1$ to $C_{18}$ alkyl; and (e) a foaming agent, wherein the molar ratio of the total isocyanate groups in (A) to the total of hydroxyl groups in (B) and (C) combined is from about 1:0.9 to about 1:1.2, respectively.

The present invention also relates to methods of preparing highly reactive, rapidly curable poly aliphaticisocyanate based polyurethane compositions, to methods of preparing injection moldable integral skin foam poly aliphatic isocyanate-based polyurethane compositions and to methods of making shaped articles from these integral skin foam polyurethane compositions.

Other object and advantages of the present invention will become apparent from, the following detailed description and illustrative working examples.

DETAILED DESCRIPTION OF THE INVENTION

It has been discovered that certain combinations, or mixtures, of lead naphthenate and dialkyl tin dicarboxylates provide enhanced reaction rates between hindered aliphatic secondary and/or tertiary isocyanates and compounds containing a plurality of hydroxyl groups. More particularly, it has been discovered that certain combinations of lead naphthenate and dialkyltin dicarboxylates are synergistic and provide reaction-cure rates several times faster than are obtained with either catalyst component alone.

The catalyst compositions of the present invention consist essentially of a mixture of:
  (i) about 75 to about 25 parts by weight of lead naphthenate; and
  (ii) about 25 to about 75 parts by weight of a dialkyl tin dicarboxylate compound of the formula:

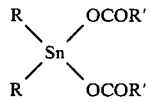

wherein R is selected from $C_1$ to $C_8$ alkyl and R' is selected from $C_1$ to $C_{18}$ alkyl, per 100 parts by weight of said catalyst composition.

The dialkyltin dicarboxylates are well known catalyst compounds per se. The preferred dialkyltin dicarboxylates for use herein are dimethyltin dilaurate and dibutyltin dilaurate. The lead naphthenate/dialkyltin dicarboxylate catalyst compositions of the present invention may, in general, be effectively employed to promote the reaction and cure of poly-aliphatic isocyanate compounds and hydroxyl-bearing compounds in concentrations of from about 0.01 to about 10.0 parts by weight, and preferably about 0.05 to about 5 parts by weight, based upon 100 parts by weight of the isocyanate and hydroxyl-bearing compounds combined.

In accordance with this aspect of the invention, new and improved highly reactive, rapidly curable polyurethane compositions are provided, said compositions comprising:
  (a) a mixture or a prepolymer of
    (i) a monomeric or polymeric compound possessing aliphatic isocyanate functionality; and
    (ii) a monomeric or polymeric compound containing a plurality of hydroxyl groups; and
  (b) a minor effective amount of a catalyst composition therefor consisting essentially of the lead naphthenate/dialkyltin dicarboxylate composition described above.

The poly aliphatic-isocyanate compounds for use herein as component (a) (i) may be monomeric or polymeric compounds having a plurality of aliphatic isocyanate terminal groups. More particularly, component (a) (i) may comprise at least one poly aliphatic isocyanate compound of the formula:

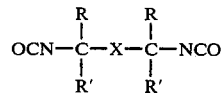

wherein R and R' are each, independently, selected from hydrogen, alkyl and substituted alkyl and X is a bridging means selected from divalent aliphatic, cycloaliphatic, and aromatic groups.

These compounds may be prepared in accordance with the methods described in U.S. Pat. Nos. 2,723,265 and 3,290,350 both of said patents being specifically incorporated herein by reference, and for example, by reacting isocyanic acid with compounds having a plurality of vinylidene groups.

Examples of poly aliphatic isocyanate compounds for use in the rapidly curable compositions of this invention include:
α,α'-dimethyl-p-xylene diisocyanate,
α,α,α',α'-tetramethyl-m-xylylene diisocyanate,
α,α,α',α'-tetramethyl-p-xylylene diisocyanate,
bis(4-(1-isocyanato-1-methylethyl) phenyl) methane,
α-ethyl-α'-methyl-p-xylylene diisocyanate,
2,6-bis (1-isocyanato-1-methylethyl) naphthalene,
1,4-bis (1-isocyanato-1-methylethyl) cyclohexane,
1,3-bis (1-isocyanato-1-methylethyl) cyclohexane,
1,8-diisocyanato-p-menthane, isophorone diisocyanate,
bis(4-isocyanatocyclohexyl)methane ("H$_{12}$MDI") and the like.

In addition to the above described monomeric aliphatic isocyanate compounds, polymeric materials derived in part from these aliphatic isocoyanates and possessing terminal aliphatic isocyanate groups may also be used as component (a) (i). The polymeric materials containing aliphatic isocyanate terminal groups are polymeric adducts or urethane precursors, formed by reacting an excess of poly aliphatic diisocyanate compound, generally about 1 molar equivalent, with a polyol compound, generally 0.3 to about 0.7 molar equivalents, in a suitable solvent at temperatures of about 70°–80° C. for several hours, although if a catalyst is used, such as an organic tin catalyst, in an amount of from about 0.005 to 0.1 percent by weight, reaction times may be considerably reduced.

Suitable polyols which may be reacted with the polyaliphatic isocyanate compounds to form isocyanate terminated urethane precursors include: monomeric polyols such as ethylene glycol, propylene glycol, diethylene glycol, triethylene glycol, dipropylene glycol, trimethylene glycol, and 1,3- and 1,4- butanediol.

Polyether polyols, which are obtained by effecting addition of one type, or two types or more, among, for example, ethylene oxide, propylene oxide, butylene oxide, tetrahydrofuran, and styrene oxide, with for example, ethylene glycol, propylene glycol, diethylene glycol, triethylene glycol, dipropylene glycol, trimethylene glycol, 1,3- and 1,4- butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, (2-hydroxyethoxy)-1-propanol, 4-(2-hydroxyethoxy)-1-butanol, 5-(2-hydroxypropoxy)-1-pentanol, 1-(2-hydroxymethoxy)-2-hexanol, 1-(2-hydroxypropoxy)-2-octanol, 3-allyloxy-1,5-pentanediol, 2-allyloxymethyl-2-methyl-1,3-pentanediol, (4,4-pentyloxymethyl)-1,3-propanediol, 3-(o-propenylphenoxy)-1,2-propanediol, 2,2'-diisopropylidenebis (p-phenyleneoxy) diethanol, glycerin, 1,2,6-hexanetriol, 1,1,1-trimethylolethane,1,1,1-trimethylolpropane, 3-(2-hydroxyethoxy)-1,2-propanediol, 3-(2-hydroxypropyl)-1,2-propanediol, 2,4-dimethyl-2-(2-hydroxyethoxy)-methylpentanediol-1,1,1-tris ((2-hydroxyethoxy)methyl)-ethane, 1,1,1-tris ((2-hydroxypropoxy)methyl) propane, pentaerythritol, sorbitol, sucrose, lactose, α-methyl glucoside, α-hydroxyalkyl glucosides, novolak resin, phosphoric acid, benzenephosphoric acid, polyphosphoric acids, such as tripolyphosphoric acid and tetrapolyphosphoric acid; and polycaprolactone may also be employed.

Polyester polyols formed from one type, or two types or more, among compounds which possess at least two hydroxy groups, such as polytetramethylene ether glycol, also ethylene glycol, diethylene glycol, triethylene glycol, 1,2-propylene glycol, dipropylene glycol, trimethylene glycol, 1,3- and 1,4- butanediol, tetramethylene glycol, neopentyl glycol, hexamethylene glycol, decamethylene glycol, glycerin, trimethylolpropane, hexanetriol, pentaerythritol, and sorbitol, and one type, or two types or more, among compounds which possess at least two carboxyl groups, such as malonic acid, maleic acid, succinic acid, adipic acid, tartaric acid, pimelic acid, sebacic acid, oxalic acid, phthalic acid, terephthalic acid, and hemimellitic acid can also be used.

Also ring-opened polymers of cyclic esters such as polycaprolactone; and furthermore, there are so-called polymer polyol compositions among polyether polyols and/or polyester polyols which can be obtained by polymerizing ethylenically unsaturated compounds, and as ethylenically unsaturated compounds which are suitable in preparing such compositions, there are for example acrylonitrile and styrene. One can further use, for example, 1,2-polybutadiene glycol, 1,4-polybutadiene glycol, polyhydroxy polyacrylates, and epoxy resins.

The polymeric isocyanate terminated urethane precursors may be used alone or they may be further reacted with still another monomeric or polymeric compound containing hydroxyl groups as component (a) (ii).

Component (a) (ii) may comprise any of the polyhydroxy compounds described above for forming the polymeric urethane precursors for use as component (a) (i). In this way, for example, a polyether adduct may be further reacted with a polyester polyol or polycaprolactone to incorporate desired end properties into the polyurethane composition, such as for example, increased flexibility or elastomeric properties.

The rapid cure polyurethane compositions of this invention also contain from about 0.01 to about 10 parts by weight of catalyst composition (b). A preferred catalyst composition consists essentially of a 50—50 weight mixture of lead naphthenate to dialkyltin dicarboxylate.

Generally, the aliphatic isocyanate component and polyol component are mixed and thereafter the catalyst composition is added immediately before use. Alternatively, the catalyst may be added as one component preferably, the polyol coxponent, some time before use. On mixing in the catalyst, and after gentle heating to about 30° C. to 100° C., the compositions rapidly react to form polyurethane compositions which gel in a matter of a few seconds to a few minutes.

The new and improved highly reactive rapid cure aliphatic-isocyanate based polyurethane compositions of this invention may be mixed and gently heated to form a variety of polyurethane products, for example, coatings and injection molded products suitable for handling in accordance with conventional polyurethane technology.

The improved cure rates provided by the new and improved catalyst mixture of the present invention make it possible to provide integral skin foam polyurethane compositions and products which are based on aliphatic isocyanates and therefore do not yellow or discolor upon exposure to sunlight or other sources of ultra violet light.

In accordance with this especially preferred aspect of the invention, new and improved injection moldable poly aliphatic isocyanate based integral skin foam polyurethane compositions are provided. The injection moldable integral skin foam compositions of this invention comprise:
  (a) a poly aliphatic isocyanate compound or a prepolymer adduct possessing polyaliphatic isocyanate functionality;
  (b) a mixed polyol component comprising:
    (i) from about 50 to about 100 parts by weight of a vinyl monomer-grafted polymeric polyol having an hydroxyl value of about 20 to about 60; and
    (ii) from about 50 to about 0 parts by weight of a polyether polyol having an hydroxyl value of about 20 to 60, per 100 parts by weight of said polyol mixture;
  (c) an effective amount of a crosslinking agent, comprising a mixture of an amino alcohol and ethylene glycol or a low molecular weight adduct of ethylene oxide and a polyol compound in a weight ratio of about 1:3 to about 3:1 respectively;
  (d) a minor effective amount of the lead naphthenate/dialkyltin dicarboxylate catalyst composition; and (e) an effective amount of a foaming agent.

In accordance with this embodiment, the aliphatic isocyanate compound or poly aliphatic-isocyanate functional prepolymer adduct is the same as is described in connection with component (a) (i) above.

Mixed polyol component (b), firstly comprises (i) from 50 to 100 parts by weight, based on the total weight of (b) of a vinyl monomer-grafted polymeric polyol having an hydroxyl value of about 20 to 60.

These grafted polymeric polyols may be prepared in accordance with known methods by polymerizing a vinyl monomer in a polyether polyol. Suitable vinyl monomers for use in forming the grafted polymeric polyol are, for example, styrene, α-methyl styrene, methyl methacrylate, acrylonitrile and the like, and mixtures of two or more of these vinyl monomers may be used. The vinyl monomer is generally added to the polyether polyol in an amount of from about 10 to about 30 parts by weight, per 100 parts by weight of the polyether polyol.

The polyether polyols for use in components (b) (i) and (b) (ii) comprise either: a polyether polyol possessing two OH groups, obtained by addition polymerizing at least one of ethylene oxide, propylene oxide and butylene oxide toward water or diols such as ethylene glycol, diethylene glycol, triethylene glycol, propylene glycol, dipropylene glycol, butanediol or hexanediol; or polyether polyols possessing from 3 to 8 OH groups, which are obtained by addition polymerizing at least one of the lower alkylene oxides toward a polyhydric alcohol, such as glycerol, trimethylol propane, hexanetriol, pentaerythritol, α-methyl glucoside, sorbitol and sucrose. The polyether polyol, whether possessing two OH groups or 3–8 OH groups, should have an overall hydroxyl number of about 20 to about 60. If the OH value is lower than this range, the reactivity of the polyether polyol decreases. Higher OH values generally yield integral skin foams which are too hard, for furniture coverings, for example.

The grafted polymeric polyol and the polyether polyols are mixed to provide the mixed polyol component (b). Generally, the grafted polymer polyol is present in component (b) in an amount of from 50 to 100 parts by weight and the polyether polyol is added in an amount of from 50 to 0 parts by weight based on the total weight of component (b). It has been discovered that if less than 50 parts of grafted polymeric polyol are used in component (b) the strength and load-supporting capability of the integral skin foam decrease and the air permeability and skinkage of the foam increase.

The new and improved integral skin foam compositions additionally comprise as component (c) a crosslinking agent comprising a mixture of at least one amino alcohol and lower alkylene glycol or a low molecular weight ethylene oxide adduct of a 3 to 6 hydric polyol.

More particularly, crosslinking agent (c) comprises an amino-alcohol selected from monoethanolamine, diethanolamine and triethanolamine, or mixtures thereof, with a lower, e.g., $C_1$–$C_6$ alkylene glycol such as ethylene glycol, butanediol, hexanediol and the like, or an ethylene oxide adduct of a polyhydric alcohol having from 3 to about 6 hydroxyl groups, for example glycerol, trimethylolpropane, 1,3,6-hexanetriol, pentaerythritol and sorbitol. In the ethylene oxide adduct generally the ethylene oxide is added in an amount sufficient to provide a molar ratio of ethylene oxide to poly hydric alcohol of from about 1:1 to about 2:1, respectively.

The weight ratio of the amino alcohol to either the lower alkylene glycol or low molecular weight polyol is preferably from about 3:1 to about 1:3.

Crosslinking agent (c) is added in an effective crosslinking amount and preferably is added in an amount of from about 5 to about 25 parts by weight based on 100 parts by weight of the mixed polyol component (b). This quantity of crosslinking agent is preferred because if less than 5 parts of crosslinker are used, same basis, longer molding cycle times are required and the load-bearing capabitites of the cured skin foam product decreases. If more than 25 parts of the crosslinking mixture are added, same basis, the integral skin foam becomes hard and inelastic, rendering it less suitable for such uses as armrests and seat covers in the interior of an automobile, for example.

The new and improved integral skin foam compositions will generally contain a molar ratio of the total isocyanate groups in (a) to the total of hydroxyl groups in (b) and (c) combined of from about 1:0.9 to about 1:1.2, respectively.

Catalyst component (d) for use in the integral skin foam composition of this invention is the same lead naphthenate/dialkyltin dicarboxylate mixture as is defined above.

Foaming agent (e) herein, may comprise any of the conventional foaming agents which are inert to the isocyanate reactants. More particularly, foaming agent (e) will comprise a low-boiling halogenated hydrocarbon, known to those skilled this art, for example, methylene cloride, trichloromonofluoromethane, $C_5$ to $C_7$ hydrocarbons and the like. The foaming agents can be added in conventional amounts and generally will be added in amounts of from about 10 parts to about 30 parts by weight based upon the weight of the overall composition.

The new and improved integral skin foam compositions of the present may also include other additives such as antioxidants, UV stabilizers, fillers, plasticizers, flame retardants, UV absorbers, dyes, pigments and the like, all of said additives being incorporated in their conventional amounts, e.g., from about 0.2 to about 2.0 parts by weight, per 100 parts by weight of mixed polyol component (b).

More particularly, the integral skin foam compositions of this invention may optionally contain antioxidant compounds which comprise various hindered phenols. Hindered phenolic antioxidants are abundantly available, for example, under the tradenanes IRGANOX 1010 and IRGANOX 1076 from Ciba-Geigy Company. As UV absobers various benzotriazoles may be employed. Commercially available compounds of this type are for example TINUVIN P, TINUVIN 327 and TINUVIN 329 from Ciba-Geigy Company. Suitable amime—type U.V. stabilizers may also be employed such as those sold under the tradenames TINUVIN 144, TINUVIN 120 and IRGASTAB 2002, from Ciba-Geigy Company.

In practice, the new and improved integral skin foam compositions of this invention are prepared by first admixing mixed polyol component (b), crosslinking agent (c), catalyst mixture (d), foaming agent (e) and any optional additives such as dyes, pigments, and/or stabilizers to form a resin solution. Thereafter, the polyisocyanate or isocyanate-terminated prepolymer adduct,(a), is added to the resin solution and the solution is thoroughly mixed. The mixed ingredients are immediately poured into a mold and are gently heated to about 30° C. to 100° C. to effect foaming and curing. In commercial practice, a coventional foam injection molding machine may be employed. After admixture and upon gentle heating for about 1 to about 5 minutes, the integral skin foam shaped article may be removed from the mold.

The new and improved integral skin foam compositions of the present invention exhibit sufficiently rapid cure rates, such that they are well suited for use in high speed reaction injection molding applications. The integral skin foam shaped articles prepared from the compositions described herein, exhibit good strength and load-bearing capabilities. They may readily be dyed or pigmented to take on light or bright color shades and do not exhibit yellowing or discoloration upon extended exposure to ultraviolet light.

In order that those skilled in the art may better understand how the present invention may be practiced, the following examples are provided by way of illustration and not by way of limitation.

DESCRIPTION OF THE PREFERRED EMBODIMENTS

EXAMPLE 1

A mixture of 10 grams of dry polytetramethylene ether glycol (OH No. 56.1, mol. wt. 2000), 0.89 grams of $\alpha,\alpha,\alpha',\alpha'$-tetramethyl-m-xylene diisocyanate, 3.66 grams of trimethylol propane, and 1.5 ml. of dry toluene was warmed to 73°–75° C. The warm solution was immediately placed in a calorimeter. To the solution was added with vigorous stirring 3.6 ml. of a 4% solution of catalyst in dry toluene (1% by weight, based on the weight of polymer reactants). The temperture initially dropped to 70° C. and was followed by an exotherm and an increase in the viscosity of the solution. The peak temperature (°C.) and the time (minutes) to cessation of flow (gelation time) were recorded. The gelation time provides a measure of catalyst efficiency, with shorter gelation time values indicating greater catalyst effectiveness. The following data were obtained.

TABLE 1

| Catalyst | Peak Temperature, °C. | Gelation Time, Min. |
| --- | --- | --- |
| Lead naphthenate (LN) | 89 | 3.5 |
| Dimethyl tin dilaurate (DMTDL) | 94 | 2.3 |
| 50/50 LN/DMTDL | 96 | 0.6 |

The data clearly show a marked increase in efficiency, as mainfested by reduced gelation time, of the 50/50 catalyst composition.

EXAMPLE 2

The procedure of Example 1 was followed except that dibutyl tin dilaurate (DBTDL) was used instead of dimethyl tin dilaurate. The following data were obtained.

TABLE 2

| Catalyst | Peak Temperature, °C. | Gelation Time, Min. |
| --- | --- | --- |
| LN | 89 | 3.5 |
| DBTDL | 94 | 4.6 |
| 50/50-LN/DBTDL | 98 | 1.1 |

The data again shows the increased efficiency of the catalyst composition of the invention.

EXAMPLE 3

The procedure of Example 1 was followed except that 3.33 grams of isophorone diisocyanate was used instead of 0.89 gram of $\alpha,\alpha,\alpha',\alpha'$-tetramethyl-m-xylene diisocyanate. The following data were obtained.

TABLE 3

| Catalyst | Peak Temperature, °C. | Gelation Time, Min. |
| --- | --- | --- |
| LN | 100 | 2.10 |
| DMTDL | 96 | 3.60 |
| 50/50-LN/DMTDL | 97 | 1.05 |

EXAMPLE 4

The procedure of Example 1 was followed except that 3.22 grams of 1,8-diisocyanate-p-menthane was used instead of 0.89 gram of $\alpha,\alpha,\alpha',\alpha'$-tetramethyl-m-xylylene diisocyanate. The following data were obtained.

TABLE 4

| Catalyst | Peak Temperature, °C. | Gelation Time, Min. |
| --- | --- | --- |
| LN | 81 | 45 |
| DMTDL | 80 | 65 |
| 50/50-LN/DMTDL | 85 | 4 |

PREPARATIONS A and B

PREPARATION OF POLYMER POLYOL A

A polymer polyol, was obtained by graft polymerizing 20 parts of an equipolar mixture of acrylonitrile and styrene to 80 parts of a polyether polyol of OH value 34 which was obtained by adding propylene oxide to glycerin and by next adding ethylene oxide.

PREPARATION OF PREPOLYMER ADDUCT B

An isocyanate-group-terminated prepolymer whose NCO group content quantity was 24.5 weight % (henceforth % will represent weight %) and whose viscosity was 90 cps/25° C., and was obtained by reacting 25 parts of a polyether polyol of OH value 34, which was obtained by polymerizing propylene oxide and ethylene oxide with pentaerythitol, with 75 parts of m-tetramethylxylyene diisocyanate (m-TMXDI).

EXAMPLE 5

A resin solution was obtained by thoroughly mixing 100 parts of polymer polyol A, 10 parts of a crosslinking agent consisting of ethylene glycol 6 parts and diethanolamine 4 parts, 4 parts of a catalyst consisting of lead naphthenate (lead content 24%) 3 parts and dimethyltin dilaurate 1 part, monochlorotrifluoromethane foaming agent 14 parts, and 2.0 parts of antioxidants/stabilizers.

Thereafter, m-tetramethylxylylene diisocyanate(m-TMXDI) 45.8 parts was added to this resin solution and after vigorously mixing for 5 seconds, this was poured into a mold at 65° C. Table 5 shows the results of measurement of the physical properties of the integral skin foam which was obtained by unmolding after letting this stand for 5 minutes.

TABLE 5

| Density | g/cm$^3$ | 0.432 |
| --- | --- | --- |

TABLE 5-continued

| 100% tensile modulus | kg/cm² | 14.4 |
| --- | --- | --- |
| Tensile strength | kg/cm² | 23.6 |
| Elongation | % | 168 |
| Tear resistance | kg/cm | 12.7 |
| Surface hardness | "Ascaa"* type C | 68 |
| Light resistance test | Fade-ometer 500 hours | No change |

*Automobile Seat Cover Association of America.

This integral skin foam did not undergo discoloration from extended exposure to ultra violet light, and it is clear from Table 5 that its strength was excellent and that it had a modulus and surface hardness which were adequately capable of withstanding load. When lead naphthenate or dimethyltin dilaurate was each used alone in the amount of 4 parts as the catalyst, not only was a long time necessary in order to remove the molded product from the mold but the surface of the molded product was sticky and the desired surface hardness could not be obtained.

EXAMPLE 6

A resin solution was prepared in accordance with Example 5 containing 100 parts of prepolymer A, 9 parts of a mixture consisting of ethylene glycol 6 parts and diethanolamine 3 parts as the crosslinking agent, and 2.5 parts of a mixture consisting of 2.0 parts of lead naphthenate (lead content 24%) and 0.5 parts of dimethyltin dilaurate as the catalyst.

The isocyanate component used comprised 56.6 parts of a prepolymer whose isocyanate content was 25.3%, which was obtained from a polyether polyol of OH value 34, which was obtained by addition polymerizing propylene oxide and ethylene oxide onto pentaerythritol, and IPDI.

The physical properties of the integral skin foam obtained when these two components were treated as in Example 5 are as shown in Table 6.

TABLE 6

| Density | g/cm³ | 0.581 |
| --- | --- | --- |
| 100% tensile modulus | kg/cm² | 37.0 |
| Tensile strength | kg/cm² | 39.8 |
| Elongation | % | 112 |
| Tear resistance | kg/cm | 14.2 |
| Surface hardness | Ascaa type C | 88 |
| Light resistance test | Fade-ometer 500 hours | No change |

It is clear from Table 6 that this integral skin foam did not undergo discoloration by light and that it excelled in mechanical properties.

EXAMPLE 7

A resin solution was obtained by thoroughly mixing 60 parts of polymer polyol A, 40 parts of the polyether polyol which was the production intermediate for polymer polyol A, 10 parts of a crosslinking agent consisting of ethylene glycol 6 parts and diethanolamine 4 parts, 2.5 parts of a catalyst consisting of lead naphthenate (lead content 25%) 2 parts and dimethyltin dilaurate 0.5 and 2.0 parts of antioxidants/stabilizers.

The isocyanate component used comprised 66.2 parts of a prepolymer of isocyanate content 24.0%, which was produced from a polyether polyol of OH value 34, which was obtained by addition polymerizing propylene oxide and ethylene oxide onto pentaerythritol, and $H_{12}MDI$.

The physical properties of the integral skin foam which was obtained by thereafter treating as in Example 5 were as given in Table 7.

TABLE 7

| Density | g/cm³ | 0.567 |
| --- | --- | --- |
| 50% tensile modulus | kg/cm² | 23.7 |
| Tensile strength | kg/cm² | 33.7 |
| Elongation | % | 80 |
| Tear resistance | kg/cm | 11.2 |
| Surface hardness | Ascaa type C | 81 |
| Light resistance test | Fade-ometer 500 hours | No change |

It is clear from Table 7 that this integral skin foam did not undergo light resisting discoloration, and that it had excellent strength.

EXAMPLE 8

A resin solution component was obtained in accordance with the method of Example 5, 14 parts of a crosslinking agent consisting of ethylene glycol 6 parts, diethanolamine 4 parts, and triethanolamine 4 parts.

The isocyanate component used comprised 76 parts of prepolymer A instead of m-TMXDI.

Using a high pressure foaming machine, model NR-230, made by Toho Kikai Company, Ltd., the composition was injection molded into a mold of inner capacity 300×500×10 mm which had been warmed to 65° C. The flow quantity ratio (weight) of the resin component and the isocyanate component was caused to be 135:76.

The product was removed from the mold after 2 minutes, and a good integral skin foam molded product was obtained. As a result of measurement of the physical properties of this article, not only did it not undergo light resisting discoloration but it had sufficient strength, as is indicated in Table 8.

TABLE 8

| Density | g/cm³ | 0.571 |
| --- | --- | --- |
| 100% tensile modulus | kg/cm² | 25.7 |
| Tensile strength | kg/cm² | 32.1 |
| Elongation | % | 128 |
| Tear resistance | kg/cm | 12.1 |
| Surface hardness | Ascaa type C | 83 |
| Light resisting test | Fade-ometer 500 hours | No change |

When lead naphthenate or dimethyltin dilaurate each was used alone in the amount of 4 parts as the catalyst, not only was much time necessary in order to remove the molded product from the mold but the surface of the molded product was sticky and the desired surface hardness could not be obtained.

Although the present invention has been described with reference to certain preferred embodiments, it is apparent that modifications and changes may be made there in by those skilled in this art, without departing from the scope and spirit of this invention as defined by the appended claims.

What is claimed is:

1. A highly reactive, rapidly curable polyurethane composition, said composition comprising:
 (a) a mixture or a prepolymer of:
  (i) a poly aliphatic isocyanate compound of the formula:

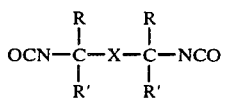

wherein R and R' are each, independently, selected from hydrogen, alkyl or substituted alkyl and X is a bridging means selected from aliphatic, cycloaliphatic or aromatic groups, or a prepolymer adduct of said isocyanate compound possessing poly aliphatic isocyanate functionality; and (ii) a monomeric or polymeric compound containing a plurality of hydroxyl groups, the molar ratio of the total amount of said isocyanate in (i) to the total amount of hydroxyl groups in (ii) being from about 1:0.8 to about 1:1.2, respectively; and (b) a minor effective amount of a catalyst composition, said composition consisting essentially of (i) from about 25 to about 75 parts by weight of lead naphthenate; and (ii) from about 75 to about 25 parts by weight of at least one dialkyltin dicarboxylate compound of the formula:

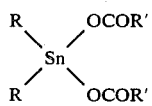

wherein R is selected from $C_1$ to $C_8$ alkyl and R' is selected from $C_1$ to $C_{18}$ alkyl, based upon 100 parts by weight of the catalyst composition.

2. A polyurethane composition as recited in claim 1, wherein said aliphatic isocyanate compound component (a) (i) comprises α, α,α',α'-tetramethyl-m-xylylene diisocyanate.

3. A polyurethane composition as recited in claim 1, component (a) (i) comprises a polymeric adduct of a poly aliphatic-isocyanate compound and an hydroxyl-terminated polyether, said adduct having aliphatic isocyanate terminal groups.

4. A polyurethane composition as defined in claim 1, component (a) (i) comprises a polymeric adduct of a poly aliphatic isocyanate compound and an hydroxyl-terminated polyester, said adduct having aliphatic isocyanate terminal groups.

5. A polyurethane composition as defined in claim 1, wherein component (b) (ii) comprises a dialkyltin dicarboxylate selected from dimethyltin dilaurate or dibutyltin dilaurate.

6. A polyurethane composition as defined in claim 1, wherein the weight ratio of component (b) (i) to (b) (ii) is about 50:50.

7. A polyurethane composition as defined in claim 1, wherein catalyst composition (b) is present in an amount of from about 0.01 to about 10 parts by weight, based on 100 parts by weight of (a).

8. A polyurethane composition as defined in claim 1, wherein catalyst composition (b) is present in an amount of from about 0.05 to about 5.0 parts by weight, based on 100 parts by weight of (a).

9. A process for catalyzing reactions between poly aliphatic isocyanate compounds and compounds possessing a plurality of hydroxyl groups, said process comprising:

(a) providing a reaction mixture of (i) a poly aliphatic isocyanate compound of the formula:

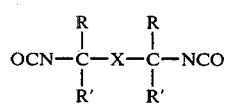

wherein R and R' are each independently, selected from hydrogen, alkyl and substituted alkyl and X is a bridging means selected from aliphatic, cycloaliphatic or aromatic groups, or a prepolymer adduct of said isocyanate compound possessing poly aliphatic isocyanate functionality; and (ii) a monomeric or polymeric compound containing a plurality of hydroxyl groups; and molar ratio of the total isocyanate groups in (i) to the total of hydroxyl groups in (ii) being from about 1:0.8 to about 1:1.2, respectively; and (b) thereafter adding a minor effective amount of a catalyst composition to said reaction mixture, said catalyst composition consisting essentially of:

(i) from about 25 to about 75 parts by weight of lead naphthenate; and (ii) from about 75 to about 25 parts by weight of a dialkyltin dicarboxylate compound of the formula:

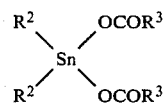

wherein $R^2$ is selected from $C_1$ to $C_8$ alkyl and $R^3$ is selected from $C_1$ to $C_{18}$ alkyl, based on 100 parts by weight of said catalyst composition; and (c) allowing the mixture of step (b) to react.

10. A process as recited in claim 9 wherein step (c) comprises gently heating the catalyzed reaction mixture of step (b) to from about 30° to about 100° C. and permitting said reaction to proceed until substantially complete.

* * * * *